United States Patent Office 3,592,700
Patented July 13, 1971

3,592,700
POLYMER COATING OF METALS
Madeline S. Toy, Fountain Valley, Calif., assignor to McDonnell Douglas Corporation, Santa Monica, Calif.
No Drawing. Filed Aug. 5, 1968, Ser. No. 750,026
Int. Cl. B44d 1/092; C23f 7/00
U.S. Cl. 148—6.3                                        14 Claims

ABSTRACT OF THE DISCLOSURE

Polymer coated metals and process therefor. The metal surface is first treated with hydrogen fluoride to form an integral, adherent surface coating of metal fluoride. The metal fluoride surface coating is then exposed to a film forming monomer, e.g., tetrafluoroethylene, to cause in situ polymerization thereon and produce a uniform, continuous, adherent polymer coating. Such tetrafluoroethylene polymer coated metal surfaces provide excellent corrosion resistance useful for protective coatings, particularly on metal structural components.

---

This invention relates to polymer coating of metal surfaces, and particularly to the production of hard, adherent tetrafluoroethylene polymer coatings on metal surfaces by a method which includes first forming a thin metal fluoride surface coating followed by in situ polymerization of the tetrafluoroethylene monomer to form a thin, corrosive-resistant film thereon.

In the copending application Ser. No. 749,999 of Madeline S. Toy and Nathan A. Tiner, filed Aug. 5, 1968, there is disclosed a process for polymer coating of metals by first treating the metal surface with elemental fluorine to produce a thin, metal fluoride coating followed by treatment with a monomer to cause in situ polymerization of the monomer to produce a thin, adherent, corrosion-resistant film thereon. It has now been found that for certain metals, particularly those which are highly reactive with elemental fluorine, for example, titanium and silver, and the oxides and alloys thereof, the above process under certain conditions, produces polymer coatings on such metals which have reduced adherence to the metal surface. According to the present invention improved results are obtained by using anhydrous HF to form the initial metal fluoride surface coating on such reactive metals. The invention process also unexpectedly provides excellent polymer coatings on aluminum and nickel, and the alloys and oxides thereof.

In recent years intensive research has taken place to find corrosion resistant superior protective coatings for metal surfaces, particularly internal surfaces of tanks for corrosive chemicals. Many conventional films have been tried but each of these suffer one or more disadvantages, e.g., failing to protect the metal against oxidation when exposed to air or moisture. Conventional Teflon (polytetrafluoroethylene) coatings appeared promising but did not meet the requirements, for reasons, it is believed, which are due to the fact that Teflon consists of helical carbon chains with many reactive impurities. Furthermore, Teflon was found to be difficult to apply to internal surfaces and resulted in a relatively thick film which is very impact sensitive.

Teflon is supplied as a water-based dispersion for application to metal or glass. Two coats of the enamel are recommended. The primer coat contains a proprietary additive to improve adhesion of the polymer to the substrate and is applied to the substrate, baked at 750° F., followed by roughening by grit blasting or acid etching. The second or finish coat may contain pigment for color but does not contain an adhesion additive that might reduce the anti-stick property of the polymer. The finish coat is applied over the primer coat and baked at 750° F. See Modern Plastics, 42, 88 (February 1965), "Fluorocarbons Move Into Consumer Goods."

Tetrafluoroethylene polymers have been available now for many years. In 1941, R. S. Plunket (U.S. Pat. 2,230,654) first patented the polymerization of tetrafluoroethylene by employing a catalyst, e.g. $ZnCl_2$ or $AgNO_3$, under pressure or in the presence of a solvent, e.g. $AgNO_3$, and methyl alcohol. In subsequent patents to Brubaker (U.S. 2,393,967), Joyce (U.S. 2,394,243) and Renfrew (U.S. 2,534,058), the process was refined by use of high pressure and suitable catalysts. Brubaker employed a pressure reactor with a catalyst consisting of a weak aqueous solution of alkali or ammonium persulfate and an alkaline buffer. In the process disclosed by Joyce, polymerization was conducted in the presence of water which could be alkaline or acidic, and using oxygen and diacyl peroxides as catalysts. Renfrew employed dibasic acid peroxide catalysts to form stable water dispersions of the polymer.

In 1963, R. H. Halliwell (U.S. 3,110,704) disclosed the polymerization of tetrafluoroethylene in an aqueous medium containing persulfate as initiator and Cu as an accelerator. Later, in 1966 D. P. Graham in the "Journal of Organic Chemistry" 31, 955 (1966) reported that tetrafluoroethylene could be polymerized with itself in the presence of CsF on an active-carbon support or in an activating solvent. The reaction was believed to proceed by the formation of the perfluoro carbanion, $CF_3CF_2^-$, addition of the perfluorocarbanion to a molecule of tetrafluoroethylene, elimination of fluoride ion to yield an olefin, and addition of another perfluoro carbanion. In the buildup of the larger molecules, the olefins or the carbanion may contain two or more ($-CF_2-CF_2-$) units.

It has now been discovered that a dense, adherent polymer, particularly polytetrafluoroethylene, coating can be formed on the surface of a metal by a unique method which comprises first treating the metal surface with anhydrous HF substantially in the absence of air and moisture for a time sufficient to convert the metal surface to a metal fluoride coating, followed by exposure of the metal fluoride surface coating to a monomer as described more fully hereinafter, preferably tetrafluoroethylene monomer, substantially in the absence of air and moisture, and preferably under pressure and at elevated temperature, to cause in situ polymerization of the monomer and produce an adherent polymer coating on the metal substrate.

Thus, the method of the invention provides an adherent, chemically bonded, integral, highly protective, thin, hard, very corrosion resistant polymer coating by an economical, simple two-step process which does not require excessive temperatures or pressures or extensive capital equipment. Parts can be coated in batch form inside a reaction chamber or, in the case of large surfaces such as the inside of a fuel tank, the vessel itself can serve as the chamber. The process is particularly suited for the coating of internal surfaces and production parts with no limitation on the surface contours since the anhydrous hydrogen fluoride and monomer can, and preferably, are applied in the gas phase.

The polymer, preferably tetrafluoroethylene polymer, coating produced by the process of the invention exhibits excellent adhesion to the metal surface since it is an integral part of the surface structure resulting from a chemical bond. The excellent adhesion of the polymer has been evidenced by the results of the snatch-pull test involving the application and removal of a pressure sensitive tape to coating specimens. Scrape adhesion tests made by a diamond edge indicate that the coating merely plastically deforms when scraped, and no brittle fracture is noted. The coating can sustain loads of about 10,000 p.s.i., with rupture occuring at about 30,000 p.s.i. compressive stress. It is well known that conventional Teflon coatings exhibit high sensitivity to abrasion.

The coating produced by the invention process is a dense, continuous film which repels water and is impervious to permeation of liquids. Metal surfaces protected by the tetrafluoroethylene polymer coating were not damaged from corrosion by salt solutions, acids and highly reactive chemicals such as fluorine.

The polymer, e.g., tetrafluoroethylene, polymer coating, moreover, is distinguished by its low friction which provides well bonded, solid film, lubricating layers. Its smooth compliant surface provides sealing surfaces with extremely low fluid leakage rates under very low contact loads. In general, titanium base and other alloy surfaces must be lapped to less than one microinch finish to attain leakage rates of $10^{-7}$ std. cc./sec. (zero leakage) under high contact stresses, usually above 40,000 p.s.i. However, when exposed to fluorine-containing and other corrosive liquids, microscopic fluid leak paths are produced at the lapped surfaces and leakage rates are increased. When coated with a polymer such as polytetrafluoroethylene by the process of the invention, sealing performance tests conducted under the same conditions suggest that leakage rates up to $10^{-7}$ std. cc./sec. can be achieved without superfinish (4–10 microinch finish) at contact stresses below 10,000 p.s.i. and the sealing surfaces are resistant to corrosion. Also, the cold flow characteristics observed on commercial polymeric gasket seals are minimized by the thin film layers and dense molecular structure of the coating.

The thickness of the polymer, e.g., tetrafluoroethylene polymer, coating is considerably less than those required for conventional internal coating systems. For example, with the process of the invention a thickness of about 0.1 to about 0.5 mil (0.003–0.012 mm.) provides excellent protection as compared with 10 mils (0.25 mm.) for prior art systems.

The tetrafluoroethylene polymer coating produced by the method of the invention differs in molecular structure from commercial tetrafluoroethylene polymers such as commercial Teflon. The photomicrograph shows that Teflon has a helical arrangement of lamella while the newly developed coating exhibits layered structure with minimum macro and micro porosities and inherently is free from reactive impurities.

As previously stated, the method of the invention first involves treatment of a metal surface with anhydrous hydrogen fluoride. Metals which are highly reactive with elemental fluorine, and the alloys and oxides thereof can be employed according to the invention, as well as certain other metals. Thus, for example, titanium, silver, aluminum, nickel, and the oxides and alloys thereof can be treated according to the process of the invention.

As used in the specification and claims, the terms "metal," "metal alloy" and "metal compound," referring to the surface which can be coated according to the invention, are intended to denote and include surfaces of bulk and particulate forms of such materials, such as the surfaces of structural parts and also, for example, powder and fiber forms of such materials.

The surface of the metal should be clean and free of grease or other contaminants prior to hydrogen fluoride treatment. Degreasing can be accomplished by many methods. A preferred procedure for titanium and silver includes dipping the metal surfaces in aqueous hydrofluoric acid (1 part 48% HF to 10 parts distilled water) at room temperature for a few minutes, rinsing immediately in distilled water and drying, followed by exposure to trichloroethylene vapor at 190° F. for 10 minutes, cooling to room temperature and finally flushing with Freon. In place of the exposure to trichloroethylene vapor, the metal can be refluxed in Freon. A preferred procedure for degreasing of aluminum and nickel includes dipping the metal surfaces in Oakite 33 solution consisting of equal parts of the material Oakite 33 (understood to be a mild acid detergent of phosphoric acid base with wetting agents and glycol ether solvent) and water, in place of the hydrofluoric acid solution used above. However, it is to be understood that any suitable cleaning and/or degreasing procedure can be employed.

The hydrogen fluoride treatment is preferably but not necessarily conducted in the gas phase. The reason for this is that by exposure to HF vapor, there is no limitation on the surface contours of the metal surface to be treated. When conducted in the gas phase, the anhydrous HF gas is generally applied to the metal surface at pressures of from less than 1 atmosphere, e.g., about 2/3 atmosphere, up to as high as 10 atmospheres. However, in preferred practice HF pressures from about 1 to about 3 atmospheres are employed. For titanium, silver, aluminum and nickel, pressures of about 1 atmosphere have been found to give best results. If desired the hydrogen fluoride gas can be mixed with an inert gas such as argon so that the HF concentration is effectively reduced and higher pressures can be employed that when the pure HF gas is used.

The temperature of HF treatment can range from low temperatures, e.g., about 20° C. to relatively high temperatures, e.g., up to about 100° C. The optimum temperature will vary with the particular metal to be treated and is partly dependent on the removal of metal oxide layer on the metal surface. It has been found that a temperature of about 100° C., particularly for titanium, gives excellent results. To some extent the temperature employed affects the characteristics of the metal fluoride film formation.

During the hydrogen fluoride treatment, it is important to exclude air and moisture as the presence of these substances interferes with the reaction. Thus, hydrogen fluoride treatment can be conducted in an inert gas atmosphere such as argon, or in a vacuum. Generally, large inner surfaces such as long pipes and large tanks can be coated economically by using the objects to be coated as the housing. For large outside surfaces, coating is less economical since a large bomb or container must be used to enclose such objects.

The time for hydrogen fluoride treatment will depend on the temperature and pressure employed and on the particular metal to be treated, but the time of treatment should be sufficient to convert the metal surface to a uniform, continuous metal fluoride coating. In general, for temperatures in the range of about low ambient to about 100° C. at atmospheric pressure, about 2 to about 20 hours treatment produces a metal fluoride film of about 10 A to about 100 A.

Hydrogen fluoride treatment of the metal surface produces a fluorine derivative of the metal. Upon subsequent treatment with the film forming monomer, the metal fluoride acts as an initiator for the in situ polymerization of the monomer on the metal fluoride surface, forming an integral chemical bond with the metal surface.

After conversion of the the surface of the metal to metal fluoride, the metal fluoride surface is treated with a monomer to produce in situ polymerization of the monomer on the metal fluoride surface layer and produces a continuous adherent polymer coating thereon.

It is believed that the in situ polymerization of the monomer proceeds by insertion of the monomer in the metal fluoride bond. Thus, using tetrafluoroethylene as the monomer, the reaction is believed to proceed according to the following reaction scheme.

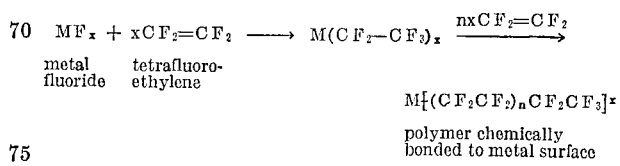

However, it is to be understood that this invention is not to be taken as limited by the above indicated scheme of reaction.

Any monomer of a film forming polymer that can be polymerized by a metal fluoride as initiator can be polymerized in situ by the process of the invention. Examples of monomers which can be employed include olefins, such as ethylene and propylene, olefin oxides, such as ethylene oxide and propylene oxide, and fluoroolefins such as tetrafluoroethylene, chlorotrifluoroethylene, hexafluoropropylene, vinylidene fluoride, and the like, and mixtures thereof, to homopolymerize or copolymerize. Tetrafluoroethylene, which forms polydifluoromethylene coatings, is preferred because of its exceptional and superior properties, particularly corrosion and oxidation resistance which this polymer imparts to the metal coated surface.

The monomer is preferably but not necessarily supplied to the metal fluoride surface in the gas phase. The monomer pressure can range from about ⅓ atmosphere to about 10 atmospheres, but it is preferred to supply the monomer under pressure of about 2 to about 5 atmospheres. The reaction taking place at the higher pressure tends to form slightly thicker and less dense coatings. It is also necessary to exclude air and moisture in the polymerization step, and hence treatment with the monomer is also carried out susbtantially in the absence of air and moisture.

The in situ monomer polymerization step preferably is conducted at elevated temperature, the particular temperature depending upon the identity of the particular monomer employed. However, temperature can range from about 0° C. to about 100° C., but for most monomers, including tetrafluoroethylene, a temperature in the range of about ambient, i.e., about 20° C., to about 100° C. has given excellent results.

Reaction time will also depend upon the particular monomer as well as on the temperature and pressure employed. The time should be sufficient to produce a uniform, continuous, dense, adherent polymer coating, which preferably has a thickness of about 0.1 mil to about 1 mil. Several minutes to several days reaction time may be necessary depending upon the process conditions. Thicker films can be produced but, in general, there is no advantage to this, and in the case of the tetrafluoroethylene polymer film, a thickness substantially greater than about 1 mil has a tendency to be less dense and translucent.

The following examples are presented for the purpose of illustrating the invention and are not intended to constitute a limitation thereof.

EXAMPLE 1

A number of metal samples comprising titanium and titanium alloys I (90 Ti, 6 Al, 4 V) and II (90 Ti, 8 Al, 1 mo, 1 V) were degreased by being dipped in a solution comprising one part 48% aqueous hydrofluoric acid to ten parts distilled water at room temperature, rinsing immediately in distilled water and drying, followed by exposure to trichloroethylene vapor at 190° F. for 10 minutes. The samples were then cooled to room temperature and flushed with Freon 113 (trichlorotrifluoroethane).

The degreased samples were hung in a stainless steel bomb which was attached to a stainless steel vacuum manifold and evacuated at 100° C. overnight. The bomb was flushed with anhydrous HF at 100° C. The samples were then exposed to anhydrous HF at 1 atmosphere pressure at 100° C. overnight. At the end of this time, the bomb was evacuated, cooled to room temperature and flushed with an inert gas followed by careful evacuation to exclude air and moisture.

The metal samples having a surface coating of metal fluoride were then contacted with tetrafluoroethylene vapor. The tetrafluoroethylene vapor was first passed through a silica gel tube to remove terpene inhibitor and then introduced into the evacuated bomb containing the metal samples at a pressure of 4½ atmospheres. The bomb was heated to a temperature of 100° C. and held at that temperature for 3 days. The bomb was then cooled to room temperature and the samples removed. On the basis of electron transmission, the polydifluoromethylene coating on the metal samples was found to be about ½ mil in thickness.

The coated surface of the titanium and titanium alloys I and II was hygrophobic, and the coated samples did not conduct current under six volts in 5% aqueous sodium chloride solution.

The coated titanium samples were tested for corrosion resistance by exposure to a 5% salt solution or salt fog at 100° F. for 48 hours. The samples exposed to the salt solution showed no corrosion.

EXAMPLE 2

Substantially the same procedure used in Example 1 was used to form an adherent tetrafluoroethylene polymer coating on silver samples. Vapor phase anhydrous HF treatment was carried out at 1 atm. at 100° C. overnight. Tetrafluoroethylene vapor was introduced into the bomb at 4½ atmospheres. The bomb was heated to 100° C. and held at that temperature for 3 days. The samples were found to have a coating of polydifluoromethylene having a thickness of 0.5 mil.

EXAMPLE 3

Substantially the same procedure employed in Example 1 was used to form an adherent, polyethylene oxide coating on titanium samples. Vapor phase anhydrous HF treatment was carried out at 1 atmosphere for 18 hours at 100° C. Ethylene oxide vapor was introduced into the bomb at ⅓ atmosphere. The bomb was held at ambient temperature for 18 hours. The samples were found to have a dense, adherent coating of polyethylene oxide having a thickness of about 1 mil.

EXAMPLE 4

Substantially the same procedure used in Example 1 was used to form an adherent tetrafluoroethylene polymer coating on the aluminum and Inconel X, an alloy of nickel and chromium, except that in the degreasing step the samples were dipped in a solution of equal parts of water and Oakite 33 in place of the hydrofluoric acid solution. The samples were found to have a dense, adherent coating of polydifluoromethylene.

EXAMPLE 5

Substantially the same procedure employed in Example 1 was used to form an adherent, polyvinylidene fluoride coating on titanium, titanium alloys 1 (90 Ti, 6 Al, 4 V) and II (90 Ti, 8 Al, 1 Mo, 1 V) and Inconel X. Vapor phase anhydrous HF treatment was carried out at 1 atmosphere pressure at 100° C. overnight. Vinylidene fluoride gas was introduced into the bomb at a pressure of 4½ atmospheres. The bomb was heated to a temperature of 100° C. and held at that temperature for 3 days. The samples were found to have a dense uniform adherent vinylidene fluoride polymer coating.

EXAMPLE 6

Substantially the same procedure employed in Example 1 was used to form a tetrafluoroethylene polymer coating on the interior surfaces of a tank formed of titanium metal using the tank as the reaction vessel.

The interior of the tank was degreased following the procedure of Example 1, followed by flushing with an inert gas. Anhydrous HF gas was introduced into the tank at 1 atmosphere pressure, for 18 hours at a temperature of 100° C. At the end of this time, the tank was evacuated, cooled to room temperature and flushed with inert gas. Tetrafluoroethylene vapor was then passed through a silica gel tube to remove terpene inhibitor and then introduced into the tank at a pressure of 4½ atmospheres. The tank was heated to a temperature of 100° C. and was held at that temperature for 72 hours. At the end of this time, the tank was cooled to room temperature. The interior of the tank was found to have a polydifluoromethylene coating of slightly less than ½ mil in thickness.

According to the invention, corrosion resistant protective polymer coatings can be formed as internal coatings for tankage, valves, piping, and the like, and can be applied to provide solid lubricant films for belts, shafts, screws, unions, rivets, stems and other components of systems subject to contact by corrosive agents, and can also be applied as seals.

It will be understood that various modifications are contemplated and may be resorted to by those skilled in the art without departing from the spirit and scope of the invention as defined by the appended claims.

I claim:

1. Method for polymer coating of the surfaces of a metal selected from the group consisting of titanium, silver, aluminum and nickel, and the oxides, and alloys thereof, which comprises treating the surface of the metal to be coated with anhydrous HF substantially in the absence of moisture and air, for a time sufficient to convert the metal surface to a metal fluoride coating, treating said metal fluoride surface coating with a monomer of a film forming polymer that can be polymerized by a metal fluoride as initiator, substantially in the absence of air and moisture, for a time sufficient to cause in situ polymerization of said monomer on said metal fluoride surface layer to produce thereon an adherent polymer coating.

2. A method as defined in claim 1, wherein said HF treatment and monomer treatment are conducted in the gaseous phase.

3. A method as defined in claim 1, wherein said monomer is selected from the group consisting of olefins, olefin oxides and fluoroolefins, and mixtures thereof.

4. A method as defined in claim 3, wherein said monomer is a fluoroolefin selected from the group consisting of tetrafluoroethylene, chlorotrifluoroethylene, hexafluoropropylene and vinylidene fluoride, and mixtures thereof.

5. A method as defined in claim 4, wherein said monomer is tetrafluoroethylene.

6. A method as defined in claim 1, wherein said HF treatment is conducted at a temperature in the range of about 20° C. to about 100° C., employing gaseous HF at a pressure ranging from about ⅔ atmosphere to about 10 atmospheres.

7. A method as defined in claim 3, wherein said monomer treatment is carried out at temperature ranging from about 0° C. to about 100° C. employing gaseous monomer at a pressure ranging from about ⅓ atmosphere to about 10 atmospheres.

8. A method as defined in claim 1, wherein said HF treatment is conducted in the gas phase at a pressure of about 1 to about 3 atmospheres at a temperature in the range of about 20° C. to about 100° C., forming a uniform, continuous metal fluoride coating, and said monomer is tetrafluoroethylene supplied to the metal fluoride surface in gas form at a pressure of about 2 to about 5 atmospheres and at a temperature in the range of about ambient to about 100° C., forming a uniform, continuous, dense adherent polymer coating.

9. A method as defined in claim 8, wherein said metal is titanium or an alloy thereof.

10. A method as defined in claim 8, wherein said metal is titanium or an alloy thereof, and said HF treatment is carried out at temperature of about 100° C.

11. A method as defined in claim 1, wherein said metal fluoride coating has a thickness in the range of about 10 A. to about 100 A.

12. A method as defined in claim 1, wherein said polymer coating has a thickness in the range of about 0.1 mil to about 1 mil.

13. A method for polymer coating of a metal selected from the group consisting of titanium, silver, aluminum and nickel, and the oxides and alloys thereof, having a uniform, continuous integral surface coating of metal fluoride thereon, comprising treating said metal fluoride surface coating with a monomer selected from the group consisting of monomers of a film forming polymer that can be polymerized by a metal fluoride as initiator, substantially in the absence of air and moisture, for a time sufficient to cause in situ polymerization of said monomer on said metal fluoride surface layer to produce thereon a uniform, continuous, adherent polymer coating.

14. Method for polymer coating of the surface of a metal which is highly reactive with elemental fluorine, or an alloy or oxide of said metal, which comprises treating said surface with anhydrous HF substantially in the absence of moisture and air, for a time sufficient to convert said metal surface to a metal fluoride coating, treating said metal fluoride surface coating with a monomer of a film forming polymer that can be polymerized by a metal fluoride as initiator, substantially in the absence of air and moisture, for a time sufficient to cause in situ polymerization of said monomer on said metal fluoride surface layer to produce thereon an adherent polymer coating.

References Cited

UNITED STATES PATENTS 2,893,900  7/1959  Machlin _____ 117—132X

RALPH S. KENDALL, Primary Examiner

CALEB WESTON, Assistant Examiner

U.S. Cl. X.R.

117—49, 132; 148—6.27